(12) United States Patent
Berger et al.

(10) Patent No.: US 9,592,485 B2
(45) Date of Patent: Mar. 14, 2017

(54) DEVICE, METHOD AND USE OF A REACTOR FOR PRODUCING STARTING MATERIALS, COMBUSTIBLE SUBSTANCES AND FUELS FROM ORGANIC SUBSTANCES

(75) Inventors: Uwe Berger, Friedewald (DE); Thomas Willner, Hamburg (DE); Walter Vanselow, Tarp (DE)

(73) Assignee: TECHNISCHE WERKE LUDWIGSHAFEN AG, Ludwigshafen (DE)

( * ) Notice: Subject to any disclaimer, the term of this patent is extended or adjusted under 35 U.S.C. 154(b) by 1311 days.

(21) Appl. No.: 12/989,138

(22) PCT Filed: Apr. 24, 2009

(86) PCT No.: PCT/EP2009/003022
§ 371 (c)(1),
(2), (4) Date: May 12, 2011

(87) PCT Pub. No.: WO2009/130045
PCT Pub. Date: Oct. 29, 2009

(65) Prior Publication Data
US 2011/0219670 A1   Sep. 15, 2011

(30) Foreign Application Priority Data
Apr. 25, 2008   (DE) .................. 10 2008 021 628

(51) Int. Cl.
*B01J 8/20* (2006.01)
*B01J 19/26* (2006.01)
(Continued)

(52) U.S. Cl.
CPC .............. *B01J 8/226* (2013.01); *B01J 8/003* (2013.01); *B01J 8/004* (2013.01); *B01J 8/0045* (2013.01);
(Continued)

(58) Field of Classification Search
None
See application file for complete search history.

(56) References Cited

U.S. PATENT DOCUMENTS 2,889,174 A * 6/1959 Schwing .................. 406/92
2,906,417 A * 9/1959 Rossi ...................... 414/218
(Continued)

FOREIGN PATENT DOCUMENTS

DE          4105726 C1 *  9/1992
DE      198 54 637 A    5/2000
(Continued)

OTHER PUBLICATIONS

Machine translation for DE 4105726 C1 (Sep. 1992).*
(Continued)

*Primary Examiner* — Jennifer A Leung
(74) *Attorney, Agent, or Firm* — Fay Sharpe LLP

(57) ABSTRACT

The invent on relates to a device for producing starting materials, combustible substances and fuels from organic substances. Said device comprises a reactor (10) that comprises a feeding device (11) for the organic substances, a discharge device (12) for the reaction products, and a device (13) for supplying reaction energy for the transformation of organic substances into the reaction products. The invention is characterized in that the reactor (10) comprises a device (14) for forming a circulating flow inside the reactor.

27 Claims, 10 Drawing Sheets

(51) Int. Cl.
*B01J 8/22* (2006.01)
*B01J 19/24* (2006.01)
*B01J 8/00* (2006.01)
*C10G 1/02* (2006.01)

(52) U.S. Cl.
CPC .............. *B01J 8/20* (2013.01); *B01J 8/224* (2013.01); *B01J 8/228* (2013.01); *B01J 19/246* (2013.01); *B01J 19/2455* (2013.01); *B01J 19/2465* (2013.01); *B01J 19/26* (2013.01); *C10G 1/02* (2013.01); *B01J 2208/00106* (2013.01); *B01J 2208/00442* (2013.01); *B01J 2208/00752* (2013.01); *B01J 2208/00902* (2013.01); *B01J 2219/00247* (2013.01); *C10G 2300/1011* (2013.01); *Y02P 30/20* (2015.11)

(56) References Cited

U.S. PATENT DOCUMENTS

| | | | |
|---|---|---|---|
| 3,173,763 A * | 3/1965 | Miller et al. | 422/227 |
| 3,776,150 A | 12/1973 | Evans | |
| 3,847,989 A * | 11/1974 | Platz et al. | 564/385 |
| RE31,676 E * | 9/1984 | Meichsner | 222/1 |
| 4,643,972 A * | 2/1987 | Young | 435/252 |
| 4,676,953 A * | 6/1987 | Jeromin et al. | 422/106 |
| 5,817,702 A | 10/1998 | Behrmann | |
| 6,227,768 B1 * | 5/2001 | Higuchi et al. | 406/89 |
| 6,350,911 B1 * | 2/2002 | Sander et al. | 564/305 |
| 6,365,047 B1 * | 4/2002 | Bischof et al. | 210/603 |
| 2,560,403 A1 | 12/2002 | Arveson | |
| 6,585,941 B2 * | 7/2003 | Zehe et al. | 422/242 |
| 2003/0033753 A1 | 2/2003 | Zahringer et al. | |
| 2003/0152507 A1* | 8/2003 | Satchell et al. | 423/406 |

FOREIGN PATENT DOCUMENTS

| | | |
|---|---|---|
| DE | 199 32 821 A | 1/2001 |
| DE | 10 2005 059856 A1 | 6/2007 |
| EP | 0 010 571 | 5/1980 |
| EP | 0 034 739 A | 9/1981 |
| EP | 0 130 499 A | 1/1985 |
| EP | 1 270 508 | 1/2003 |
| EP | 1 484 343 A | 12/2004 |
| EP | 1484343 A1 * | 12/2004 |
| FR | 1 256 519 A | 3/1961 |
| GB | 324392 A * | 1/1930 |
| GB | 891 648 A | 3/1962 |
| GB | 895038 | 4/1962 |
| GB | 1 417 464 A | 12/1975 |
| RU | 2113452 | 6/1998 |
| RU | 2126934 | 9/1999 |
| SU | 975052 A | 11/1982 |
| WO | WO 01/94281 | 12/2001 |
| WO | WO 2004/085578 A | 10/2004 |

OTHER PUBLICATIONS

Schluter et al. Influence of local effects in three phase flows on power input in Jet-Loop Reactors. Powder Technology 151 (2005) 68-76.*

* cited by examiner

DEVICE, METHOD AND USE OF A REACTOR FOR PRODUCING STARTING MATERIALS, COMBUSTIBLE SUBSTANCES AND FUELS FROM ORGANIC SUBSTANCES

This application is a 371 of PCT/EP09/03022 filed Apr. 24, 2009, which claims foreign priority to German Patent Application 10 2008 021 628.3 filed Apr. 25, 2008, the entire contents of which are incorporated herein by reference.

The invention relates to a device, method and the use of a reactor for producing starting materials, combustibles and fuels from organic substances. A known device was disclosed in DE 102 15 679 A1.

A method for the direct thermochemical conversion of high-molecular weight organic substances into high-grade low-molecular weight organic products which are present as low-viscosity liquids at room temperature and are combustible is known. In this method, organic substances in the form of preferably solid, renewable starting materials and/or residual substances are converted by direct liquefaction into highly refined liquid hydrocarbons with the objective of using these products chemically and energetically. This known method is mainly suitable for the production of fuels for conventional motor vehicles, i.e. for the production of petrol or diesel.

The method disclosed in DE 102 15 679 A1 for direct liquefaction is a catalytic-thermal conversion process, in which high-grade, liquid products are produced from high-molecular weight organic substances by crack and refining reactions, assisted by catalysts, in a direct manner, i.e. without a diversion via gasification.

To carry out this direct thermochemical method for liquefying organic substances, stirred-tank reactors for example are used which provide a thorough mixing and are suitable for reactive distillation and as stripping gas reactors. However, stirred-tank reactors suffer from the disadvantage that the moving component parts arranged in the reactor, i.e. the stirring elements, lead to sealing problems when the reactor works at elevated temperatures and under pressure. In contrast thereto, flow reactors, for example tubular reactors offer the advantage of a simple construction without moving components. The use of flow spoilers, for example in the form of static mixers or static mixing elements allows a thorough mixing of the components.

However, tubular reactors of this type are not suitable for reactive distillation or as a stripping gas reactor and an optimum residence time control of the molecules to be cracked is impossible. The molecules to be cracked are sometimes in the reaction zone for too long, sometimes not long enough, thus providing a low oil product yield or an excessively high gas product yield.

The object of the invention is to provide a device for the production of starting materials, combustibles and fuels from organic substances which, with a comparatively simple construction, allows an efficient conversion of the organic substances into starting materials, combustibles and fuels which are of the highest possible quality.

Another object of the invention is to provide a method and use of a reactor for the production of starting materials, combustibles and fuels from organic substances which respectively allow, in a simple manner, an efficient conversion of the organic substances into starting materials, combustibles and fuels which are of the highest possible quality.

According to the invention, this object is achieved by the devices, methods and uses of the present disclosure.

Accordingly, the invention is based on the concept of providing a device for the production of starting materials, combustibles and fuels from organic substances which comprises a reactor with a feed arrangement for the organic substances, a discharge arrangement for reaction products and an arrangement for supplying reaction energy for the conversion of the organic substances into the reaction products. According to the invention, the reactor comprises an arrangement for forming a circulating flow inside the reactor. Thus, the reactor of the device according to the invention is a flow reactor which is adapted such that a circulated flow is formed inside the reactor, without mechanically moving elements being required for this purpose. The circulating flow inside the reactor ensures an optimised production-orientated mixing and reaction result, without mechanically moving component parts being required for this purpose. This means that it is possible to operate the reactor at elevated temperatures and under elevated pressures, without leading to sealing problems. In this respect, the circulating flow inside the reactor produces an outstanding intermixing of the components, even if they are present in different phases. In particular, a good intermixing is possible of up to three phases with the aggregate states of liquid, gas and solid. Furthermore, the device according to the invention allows a very rapid heating of the starting materials and auxiliaries which have been introduced, so that the reactor is especially suitable particularly for the shock heating method disclosed in DE 102 15 679 A1. The circulating flow inside the reactor allows catalytic and non-catalytic, as well as hydrogenating and non-hydrogenating conversion reactions. Due to a reactive distillation or stripping gas function, the reactor provides the prerequisites for a production-oriented residence time optimisation.

In a preferred embodiment of the invention, the arrangement for forming the circulation inside the reactor comprises at least one propulsion jet nozzle which discharges into a housing of the reactor. The propulsion jet nozzle can inject a propulsive medium, for example a gas or liquid, into the reactor such that a circulating flow develops in the reactor. The propulsion jet nozzle can have at least two nozzle pipes, thereby enabling the separate feed of the organic substances and the injection of a propulsive medium. The formation of the circulating flow inside the reactor is assisted in that at least one guide pipe is arranged in the housing such that it aligns with the propulsion jet nozzle. This arrangement allows the formation of a circulating flow in the form of a double loop which results in a particularly effective intermixing of the components.

In a further preferred embodiment of the invention, the reactor comprises an arrangement for forming a circulation outside the reactor, in which case at least one circulation line connects two spaced apart portions of the reactor. This means that the reactor allows the formation of a circulation inside the reactor and a circulation outside the reactor, i.e. two circulations. The connection of two spaced apart portions of the reactor by the circulation line allows a recirculation, for example of the sump oil for doping the reactor.

The circulation line can be connected to the propulsion jet nozzle, in particular to one of the two nozzle pipes, producing a particularly compact configuration of the device. The circulation outside the reactor can have a heating arrangement and/or a filter arrangement.

To improve the gas-liquid separation, a degassing arrangement can be positioned upstream of the discharge arrangement inside the reactor.

In a further preferred embodiment of the invention, the feed arrangement has a pneumatic and/or mechanical means for the supply of solid material, thereby allowing a particularly efficient feed of the organic substances both in continuous operation and in discontinuous operation. To prevent bridge formation, the pneumatic and/or mechanical means for solids supply can have a high temperature-resistant anti-adhesion coating.

The pneumatic means for solids supply is preferably associated with the arrangement for forming the circulation inside the reactor, so that the latter performs a double function in respect of the feed of organic substances and also in respect of the formation of the circulation inside the reactor. In this respect, the pneumatic means for solids supply can be connected to the propulsion jet nozzle, in particular to one of the two nozzle pipes. One possibility of realising the pneumatic means for solids supply is to provide at least one pressurised conveying container which can be connected to the reactor, in particular to the propulsion jet nozzle. A continuous solids supply can be achieved by the provision of two pressurised conveying containers which can be operated in alternation.

The pneumatic means for solids supply can have a transport gas arrangement and/or a fluidising gas arrangement which can be connected to the pressurised conveying container or containers, as a result of which the pressurised conveying container can be pressurised that is, both with an inert gas and with a reaction gas. The discharge of a solid material from the pressurised conveying container can be performed or assisted by the transport gas arrangement. The fluidising function by means of the fluidising gas arrangement prevents a consolidation of the solid particles and prevents the particles from adhering to the wall of the container.

In this respect, a gas-permeable lining of the pressurised conveying container can be arranged at least in the region of a supply opening in the pressurised conveying container for the fluidising gas arrangement. Consequently, on the one hand, a homogeneous fluidisation of the material in the pressurised conveying container is achieved and on the other hand, an undesirable adhesion of the material to the container wall and a blocking of the supply opening in the pressurised conveying container is prevented. A supply means of the transport gas arrangement is preferably arranged in the region of a discharge opening in the pressurised conveying container. As a result, a particularly efficient discharge of solids from the pressurised conveying container is achieved. The supply means can comprise a lance which projects into the pressurised conveying container as far as into the region of the discharge opening so that the transport gas can be blown purposefully into the desired region.

The mechanical means for solids supply can be associated with the arrangement for forming the circulation outside the reactor. Since the circulation outside the reactor is in particular a recirculation or return of the sump phase of the reactor, the mechanical feed of the organic substances is particularly advantageous in this region. The mechanical means for solids supply can be arranged in the conveying direction upstream or downstream of a pump of the arrangement for forming the circulation outside the reactor. A slurrying arrangement can be arranged upstream of the mechanical means for solids supply, so that before being fed into the reactor, the organic solids can be suspended or dissolved by a suitable organic liquid or, if appropriate, also by water. The mechanical means for solids supply can comprise a sluice arrangement which can render inert the solids to be introduced into the reactor. Furthermore, the sluice device can prevent gases, vapours and liquids from issuing out of the reactor and, if appropriate, can seal against an elevated reactor pressure.

For continuous operation, in particular a continuous feed of solid material, the mechanical means for solids supply can comprise a worm arrangement with a pressure blocking portion which is arranged downstream of a compression portion to form a blocking plug. Consequently, pressure losses of the reactor during the feed of solids are prevented or reduced. A further possibility of feeding the organic substances is for the mechanical means of the solids supply to comprise a piston arrangement. The piston arrangement affords the advantage that the conveying or feeding of unslurried solids is possible, thereby promoting a rapid heating in the reactor. The piston arrangement can comprise at least one pressure cylinder, in particular two pressure cylinders, continuous conveying being achieved in the latter case.

The method according to the invention is based on the concept of feeding the organic substances into a reactor, of converting said organic substances into reaction products with the supply of reaction energy and discharging the reaction products out of the reactor. According to the invention, a circulating flow is formed in the reactor. Consequently, a particularly good intermixing of the components is achieved, even if they are present in up to three different phases, without mechanically moving component parts being required for this purpose. To form the circulating flow, a pressurised propulsive medium can be introduced into the reactor. In this respect, a one-phase, two-phase or three-phase operation of the reactor is possible.

The invention further includes the use of a reactor for the production of raw substances, combustibles and fuels from organic substances comprising a feed arrangement for the organic substances, a discharge arrangement for reaction products and an arrangement for the supply of reaction energy to convert the organic substances into reaction products, the reactor having an arrangement for forming a circulating flow inside the reactor. The reactor which is used is preferably a loop reactor.

In the following, the invention will be described more precisely with further details on the basis of embodiments with reference to the accompanying schematic drawings. In the drawings:

FIG. 1 is a cross-sectional view of a reactor which is used according to the invention for the production of starting materials, combustibles and fuels from organic substances by direct liquefaction. In this respect, a multi-phase mixing reactor, namely a loop reactor is specifically used.

Figure 1:
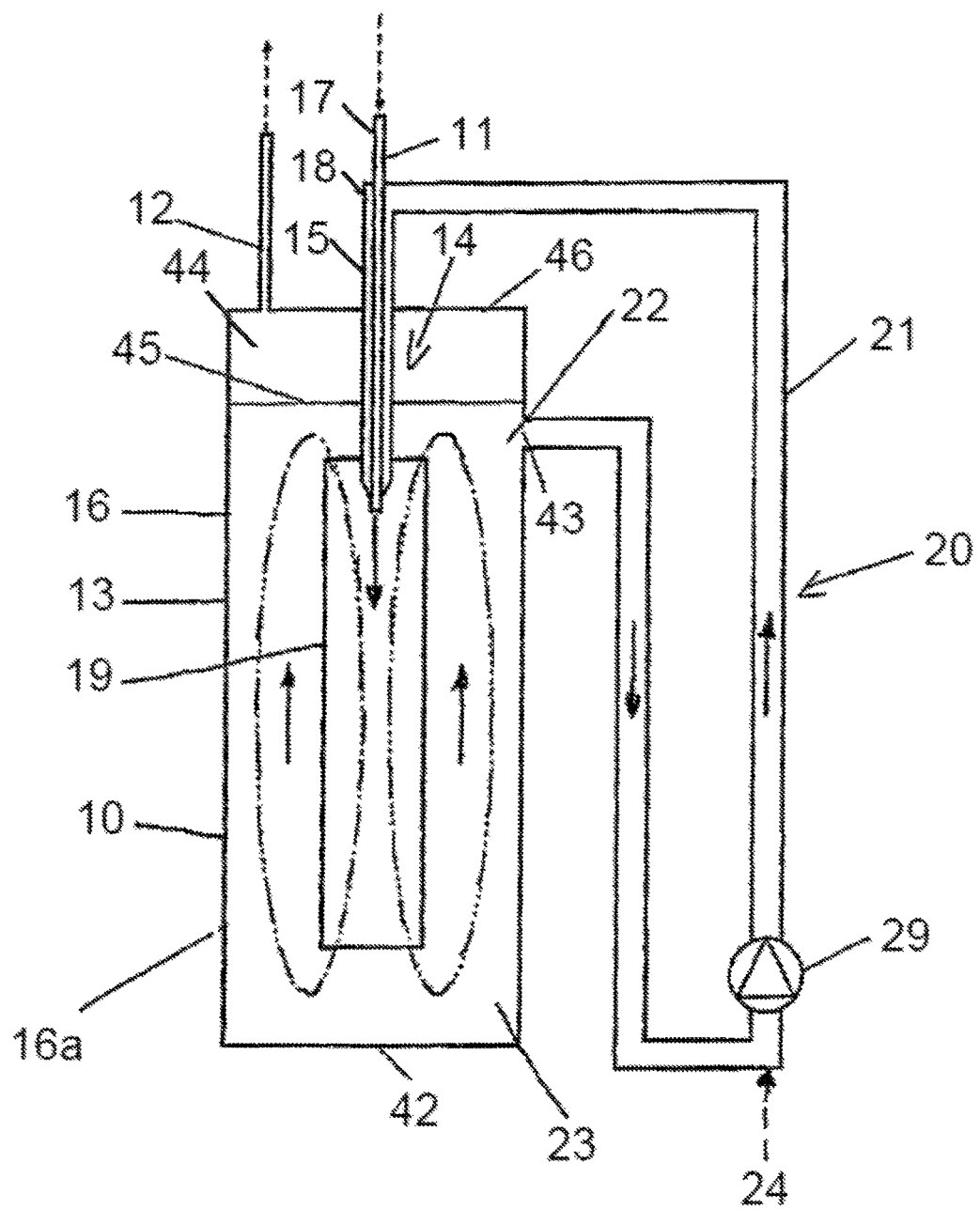
FIG. 1 is a schematic cross-sectional view through the reactor of a device for the production of starting materials, combustibles and fuels from organic substances according to an embodiment of the invention.

The reactor 10 comprises a housing 16 with a vertically arranged cylindrical casing 16a. Provided at the upper axial end of the reactor is a feed arrangement 11 through which organic substances are conveyed into the reactor 10. Also arranged at the upper axial end of the reactor 10 is a discharge arrangement 12 for reaction products, for example readily volatile hydrocarbon compounds, which is connected, for example to a distillation column (not shown). Integrated into the cylindrical casing 16a of the housing 16 are heating elements which form the arrangement 13 for the supply of reaction energy. The heating elements can be configured for therma or inductive heating or for microwave heating. The arrangement 13 can also comprise means for pressurising the reactor, so that both a pressurised and an unpressurised operation of the reactor 10 is possible.

The reactor further comprises an arrangement 14 for forming a free circulating flow inside the reactor with at least one propulsion jet nozzle 15 which discharges into the housing 16 in the upper region of the reactor 10. The propulsion jet nozzle 15 is configured as a double pipe nozzle or as a ternary nozzle and has two concentrically arranged nozzle pipes 17, 18.

Figure 2:
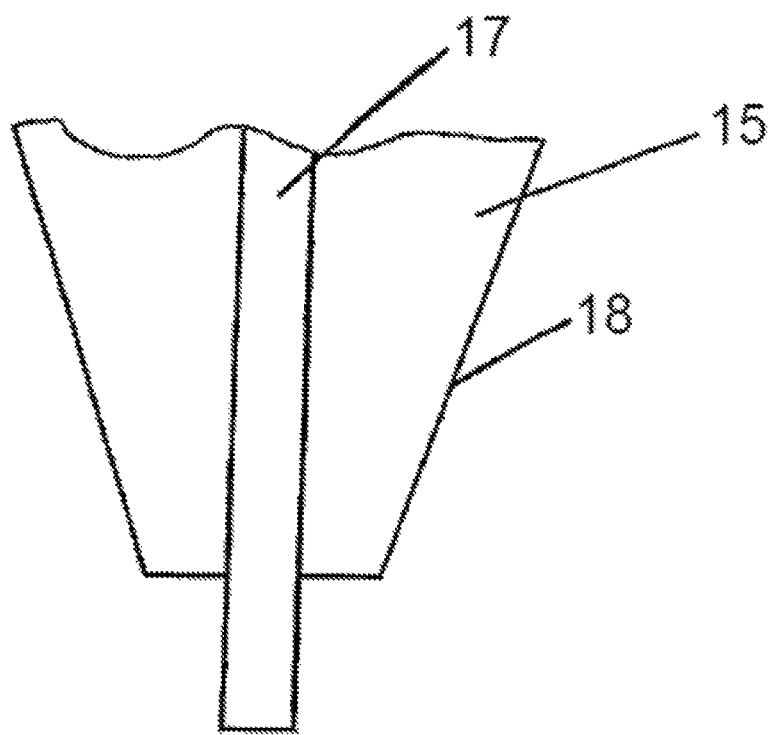
FIG. 2 is a detail view of the propulsion jet nozzle of the reactor according to FIG. 1.

FIG. 2 is a detail view of the outlet region of the propulsion jet nozzle 15 with the two nozzle pipes 17, 18. It can be seen here that the inner pipe 17 projects axially beyond the outer pipe 18, an annular gap being formed between the inner pipe 17 and the outer pipe 18. This means that medium can be transported into the reactor 10 through the inner pipe and through the outer pipe. The inner nozzle pipe 17 preferably projects out of the nozzle outlet cross section by 0.4-6 times the nozzle diameter, i.e. the outlet diameter of the outer nozzle pipe 18. The ratio of the diameter of the inner nozzle pipe 17 to the diameter of the outer nozzle pipe 18 in the region of the outlet opening of propulsion jet nozzle 15 is between 0.4 and 0.9.

The inner pipe 17 is connected to a solids supply (not shown in FIG. 1), in particular to a pneumatic solids supply. The outer pipe 18 is connected to a return line or a circulation line 21, generally to an arrangement 20 for forming a circulation outside the reactor. Associated with propulsion jet nozzle 15 is a guide pipe 19 or a flow guide pipe, the guide pipe 19 and the propulsion jet nozzle 15 being arranged in alignment. As can be seen in FIG. 1, the outlet end of propulsion jet nozzle 15 can project into the guide pipe, on that in this region the guide pipe 19 concentrically surrounds propulsion jet nozzle 15. A gap is provided between the lower edge of the guide pipe 19 and a housing floor 42 of the reactor 10. The guide pipe 19 is open at both axial ends and, together with propulsion jet nozzle 15, forms part of the arrangement 14 for forming a free circulating flow inside the reactor. The ratio of the diameter of the outer casing 16a to that of the flow guide pipe 19 is preferably from 3:1 to 5:1.

The arrangement 20 for forming the circulation outside the reactor comprises the circulation line 21 which connects two spaced apart portions 22, 23 of the reactor 10. Specifically, the circulation line 21 connects a portion arranged in the upper region of the reactor 10 to the axial upper end of the reactor 10, thereby forming a circulation outside the reactor. In this respect, the circulation fine 21 connects a region of the reactor 10 in which there is a sump oil-biomass-stripping gas mixture, to the propulsion jet nozzle 15. As apparent from FIG. 1, the circulation line 21 forms the outer nozzle pipe 18 of the propulsion jet nozzle 15. A pump 29 which is capable of conveying a solid material load is provided for circulating the sump oil in the circulation outside the reactor. Instead of the organic substances being fed in pneumatically, i.e. by the pneumatic means 14, they can also be fed in mechanically, in which case a suitable mechanical means 15 for the solids supply is connected either upstream or downstream of the pump 29 in the conveying direction. The mechanical feed of the organic substances into the circulation outside the reactor is indicated in FIG. 1 by a dashed arrow which is upstream of the pump 29 in the conveying direction. The mechanical solids supply can be provided instead of the pneumatic solids supply or in addition thereto.

The circulation line 21 forms a sump oil discharge 43 at the point where the circulation line 21 discharges into the reactor 10. This sump oil discharge 43 is at such a distance from the axial upper end of the reactor 10 that a liquid level develops above the sump oil discharge 43 and a gas collecting chamber 44 is formed between the liquid level 45 and the upper axial end 46 of the reactor. The opening of the propulsion jet nozzle 15 is arranged in an axial direction below the sump oil discharge 43, but is at least arranged such that during operation of the reactor 10, it is ensured that the opening of the propulsion jet nozzle 15 is located below the liquid level 45. Specifically, the propulsion jet nozzle 15 is arranged such that a liquid level 45 develops which is approximately at a level, corresponding to 0.4 to 1.5 times the diameter of the flow guide pipe 19, above the upper axial end of the flow guide pipe 19.

The arrangement 20 for forming the circulation outside the reactor 10 can be fitted with heating elements 20a and/or a filter arrangement 20b. The filter arrangement 20b is configured as a bypass flow filtration which is integrated into the circulation outside the reactor. For this purpose, a partial flow is branched off from the circulation outside the reactor (main flow) and is fed to the filter arrangement. The oil sludge filtered out of the partial flow is sluiced out of the filter arrangement and disposed of or further processed. The partial flow filtered in the filter arrangement 20b is re-supplied to the circulation outside the reactor (main flow). The filtered partial flow is supplied to the main flow on the suction side of the pump 29 of the circulation outside the reactor. This means that the filtered partial flow is admixed with the unfiltered main flow. In the embodiment, the heating elements 20a arranged in the circulation outside the reactor are arranged upstream of the branch of the unfiltered partial flow to the filter arrangement 20b, but can also be arranged downstream thereof according to the construction.

As described above, the main flow of the circulation outside the reactor downstream of the branch of the partial flow is re-supplied to the reactor 10 or to the sump phase of the reactor 10.

Figure 11:
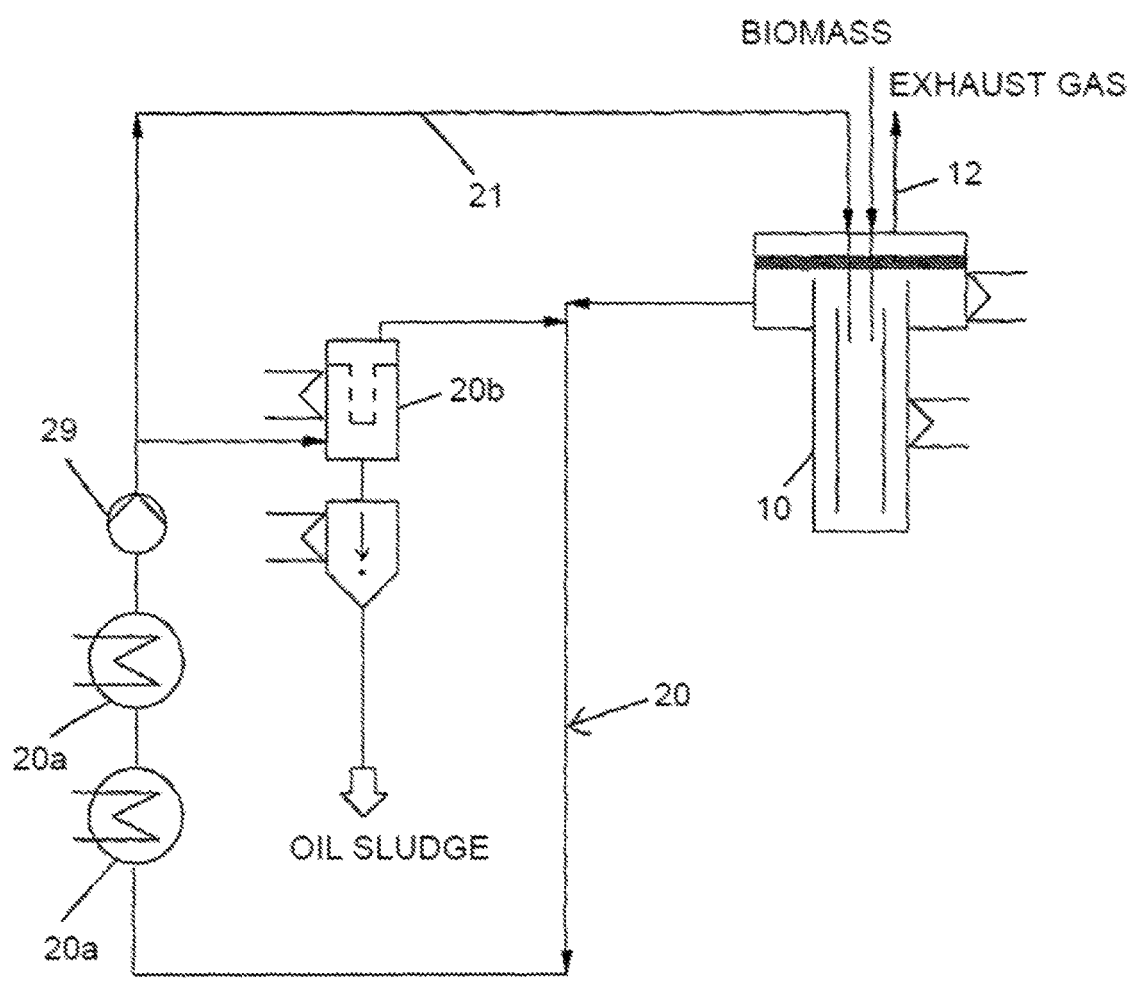
FIG. 11 is a schematic view of the by-pass flow filtration circulation.

The bypass flow filtration is shown in FIG. 11.

The mode of operation of the reactor 10 according to FIG. 1 is explained as follows.

Biomass is fed pneumatically to the propulsion jet nozzle 15 by means of reaction/stripping gas through the inner nozzle pipe 17. At the same time, sump oil is fed to the outer nozzle pipe 18 of the propulsion jet nozzle 15 through the circulation line 21. The stream of sump oil issuing from the propulsion jet nozzle 15 suctions up the reaction/stripping gas guided in the low pressure region of the propulsion jet nozzle 15 via the centrally arranged inner nozzle pipe 17 leaving the nozzle outlet cross section radially open, thereby achieving an extremely fine distribution of the gas bubbles.

The gas bubbles are mixed intensively with the biomass and the sump oil. Therefore, the reactor 10 is operated both with a free internal circulating flow, i.e. without the aid of mechanically moving component parts, which is started by the injection of a propulsive medium, for example the sump oil from the reactor 10 through the propulsion jet nozzle 15, and with an external circulation which is guided through the circulation line 21 and is driven by the pump 29.

The reactor 10 according to FIG. 1 ensures an unexpectedly optimum mixing behaviour of the three phases of gas, liquid and solid. At the same time, the reactor circulation ensures a production-oriented residence time control with a discharge of the readily volatile target products and a selective sluicing out of solids from the poorly volatile product fraction remaining in the reactor circuit. The solid starting materials and auxiliaries are introduced by feed arrangements which are capable of being fed as continuously as possible into a reactor system which is under high excess pressure. In this respect, the solids are fed pneumatically together with a reaction gas or an inert carrier gas directly into the optimum mixing and reaction zone of the reactor. The reactor 10 is preferably configured as a loop mixer with an integrated phase separation, without mechanically moving elements and with both a circulation inside the reactor and a circulation outside the reactor. Thus, a surprisingly ideal product-oriented mixing and reaction result is obtained. The external reactor circulation is driven hydraulically by the circulation pump 29 which is suitable for the solids load and gas load and which also drives the internal reactor circulation via the propulsion jet nozzle 15. Furthermore, if required, suspensions with catalysts or auxiliaries can be fed into the reactor circuit by a pump.

Figure 3:
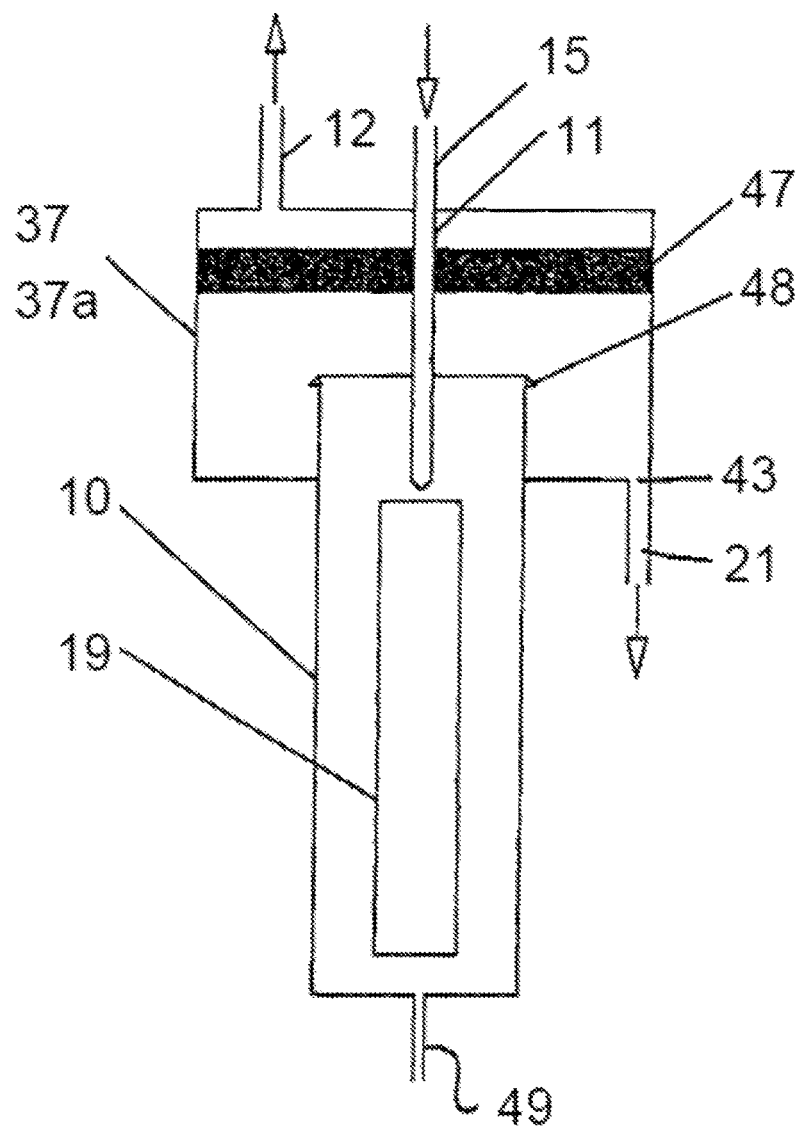
FIG. 3 shows another embodiment of a reactor for a device for the production of starting materials, combustibles and fuels from organic substances.

A further embodiment of a reactor 10 is shown in FIG. 3. The reactor 10 in FIG. 3 is constructed similarly to the reactor 10 according to FIG. 1 and also comprises a degassing arrangement 37, specifically a degassing head 37a for an improved gas-liquid separation. The degassing head 37a is arranged between the reactor 10 and the discharge arrangement 12 for the readily volatile hydrocarbon compounds. As can be seen in FIG. 3, the degassing head 37a engages over the reactor 10. The discharge arrangement 12 for the reaction products is provided on the degassing head 37a, as is the sump oil discharge 43 which connects the degassing head 37a to the circulation line 21. In FIG. 3, only part of the circulation line 21 has been shown. The arrangement of the circulation line 21, in particular the connection with the propulsion jet nozzle 15 corresponds to the arrangement of FIG. 1.

The degassing head 37a comprises a droplet collector 47 which is arranged below, that is, upstream of the discharge arrangement 12 for the readily volatile hydrocarbon compounds and extends over the cross section of the degassing head 37a. The droplet collector 47 is provided for the retention of aerosols and is adapted accordingly. Provided in addition to the droplet collector 47 is a drip ring 48 which is mounted on or formed integrally with the outer edge of the upper axial end of the reactor 10.

Furthermore, according to FIG. 3, a drainage line 49 is provided on the housing floor 42 of the reactor 10. This drainage line 49 can also be provided in the reactor according to FIG. 1.

The reactor 10 according to FIG. 3 is operated in a similar manner to the reactor 10 of FIG. 1. In this respect, reference is made to the description of FIG. 1.

The invention also includes embodiments in which more than one propulsion jet nozzle 15, for example two, three, four or even more propulsion jet nozzles 15 are provided. In this respect, a flow guide pipe 19 is associated with each propulsion jet nozzle 15. Alternatively, it is also possible for several propulsion jet nozzles 15 to be associated with one flow guide pipe 19 and, in this case, the flow guide pipe 19 has larger dimensions accordingly. The use of several propulsion jet nozzles 15 allows the adjustment of a correspondingly multiple-loop flow profile in the reactor 10.

Figure 4:
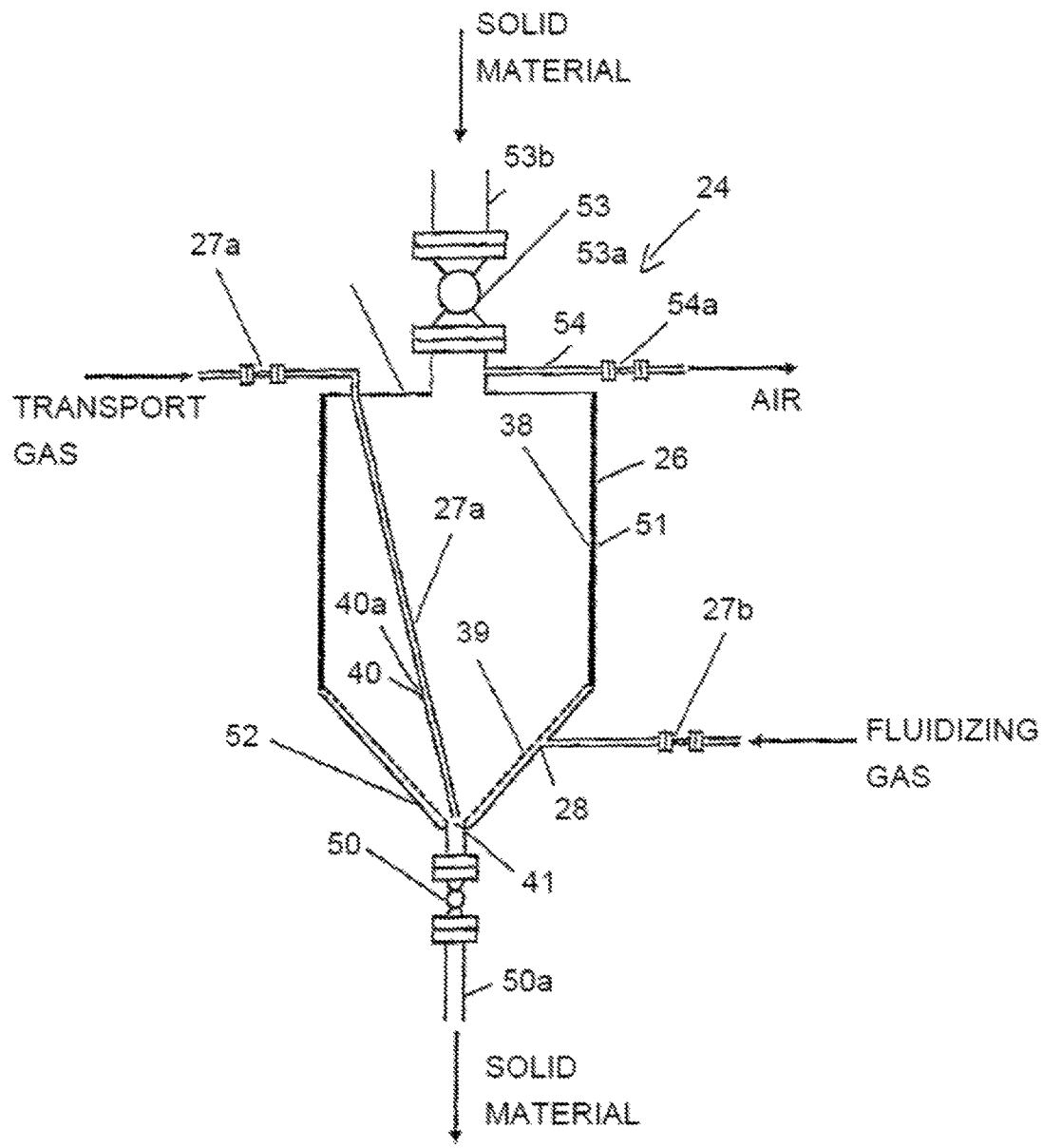
FIG. 4 is a schematic cross-sectional view through a pneumatic solids supply arrangement.

In the following, the different feed systems will be explained, using which biomass or in general organic substances can be introduced into the reactor 10. In FIG. 4, the feed arrangement 11 is configured as a pneumatic means 24 for the supply of solids. The pneumatic means 24 according to FIG. 4 is associated with the arrangement 14 for forming the internal reactor circulation, i.e. the pneumatic means 24 is connected to the propulsion jet nozzle 15, in particular to the internally arranged nozzle pipe 17 of the propulsion jet nozzle 15.

The pneumatic means 24 has a pressurised conveying container 26 which can be connected to the reactor 10 or to the propulsion jet nozzle 15 via a valve arrangement, for example via an outlet ball valve 50. Other types of valve can be used instead of the outlet ball valve 50. The pressurised conveying container 26 comprises an upper cylindrical portion 51 and a lower conical portion 52. A supply arrangement 53, for example with a feed ball valve 53a is provided for the solids supply. Charging with organic substances is indicated by a corresponding arrow in FIG. 4. Positioned downstream of the supply arrangement 53 is an exhaust pipe 54 through which displaced air can escape.

The pressurised conveying container 26 is connected to a compressed gas arrangement through which a fluidising gas and a transport gas are supplied. The gas supply arrangement for transport gas 27a comprises a supply means 40, for example in the form of a lance 40a which discharges in the region of the discharge opening 41 of the storage container 26. Consequently, the feed of the transport gas is deliberately achieved at the place where the solids are discharged from the pressurised conveying container 26.

A further gas supply arrangement 27b for the fluidising gas (fluidising gas arrangement) is also provided which is connected to the compressed gas arrangement and has a feed opening 28 which is arranged in the lower conical portion 52 of the pressurised conveying container 26. As a result, a particularly efficient fluidisation of the solids located in the pressurised conveying container 26 is achieved. The lower conical portion 52 is provided with a gas-permeable lining 39 which is arranged at least in the region of the feed opening 28 of the fluidising gas arrangement 27b. In the pressurised conveying container 26 according to FIG. 1, the entire lower conical portion 52 is lined. The lining 39 thus forms a porous ventilation cone which promotes a homogeneous fluidisation of the solids. The lining 39 also prevents a bridge formation of the crushed solids in the pressurised conveying container 26. For this purpose, the upper cylindrical portion 51 is also coated with a high temperature-resistant anti-adhesion coating 38. The lining 39 is open in the region of the discharge opening 41.

The pressurised conveying container 26 according to FIG. 4 is operated as follows:

The crushed solids are introduced into the pressurised conveying container 26 through the feed line 53b via a suitable transport device while the feed ball valve 53a and the exhaust gas ball valve 54a are open. The air which is displaced as a result escapes via the exhaust pipe 54. When the pressurised conveying container 26 is full, the feed ball valve 53a closes and inert gas flows initially through the fluidising gas arrangement 27b into the pressurised conveying container 26. When the pressurised conveying container 26 has been rendered inert, the exhaust gas ball valve 54a is closed and the pressurised conveying container 26 is brought to operating pressure selectively with inert gas or reaction gas by the transport gas and/or fluidising gas arrangements 27a, 27b. After attaining the operating pressure, the outlet ball valve 50 opens and transport gas is blown through the lance 40a of the transport gas arrangement 27a in the region of the discharge opening 41. Consequently, the solid material in the pressurised conveying container 26 is transported together with the reaction gas though the drainage line 50a to the reactor 10 or to the propulsion jet nozzle 15.

The solid material is discharged in a metered manner out of the pressurised conveying container 26 by a purposeful adjustment of the ratio of fluidising gas to transport gas.

Figure 5:
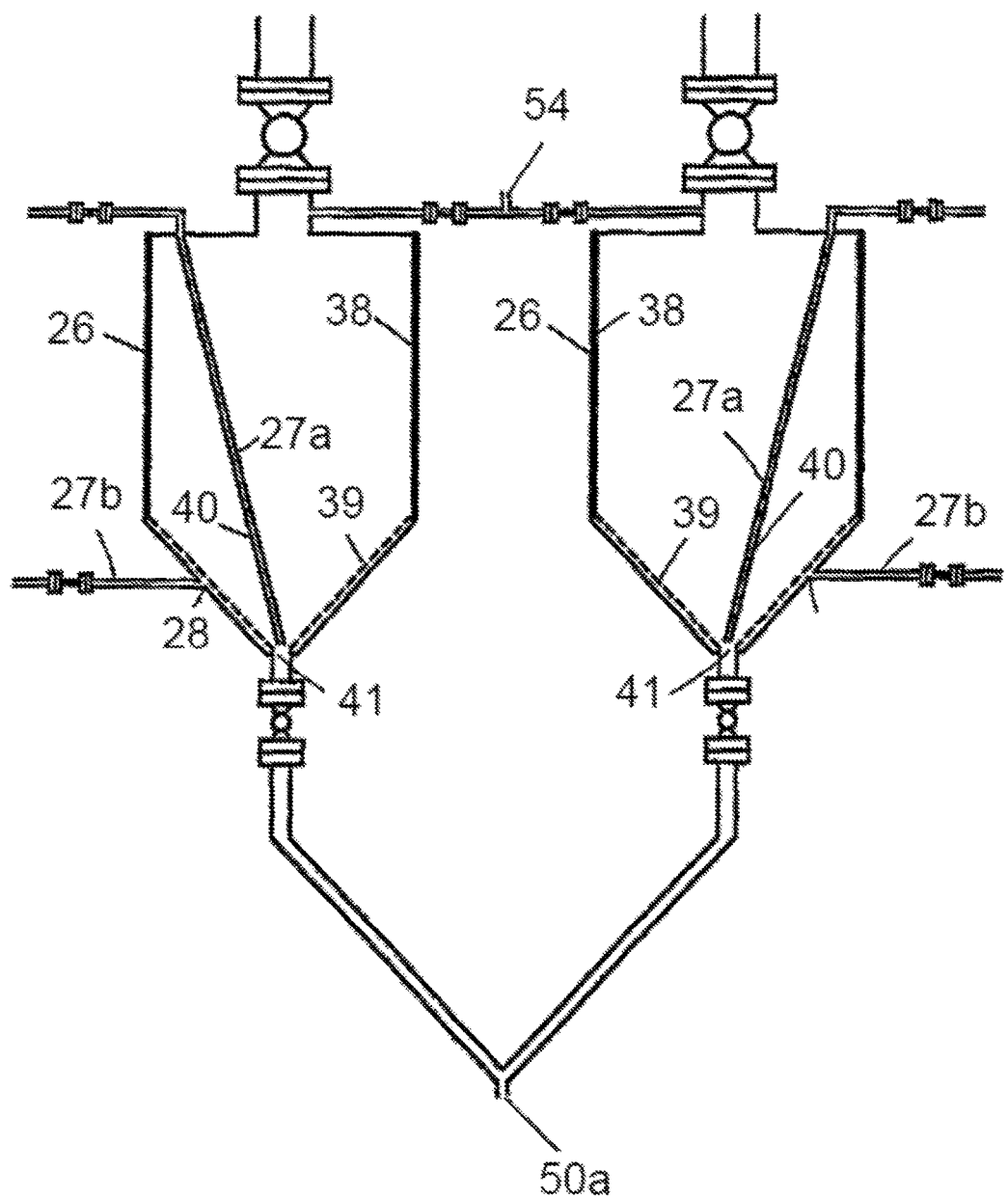
FIG. 5 shows a combination of two solids supply arrangements according to FIG. 4.

A continuous operation of the pneumatic means 24 can be achieved by connecting at least two or more pressurised conveying containers 26, as shown in FIG. 5. The two pressurised conveying containers 26 have a common exhaust pipe 54 and a common drainage line 50a. By a selective operation of the two pressurised conveying containers 26, one of the two containers respectively operates as a storage container, while the respective other container conveys the solid material. As soon as this container is empty or almost empty, operation is switched over to the other container which in the meantime has been filled. The pressurised conveying container 26 operating as a storage container thus serves as a temporary storage (buffer container) and simultaneously as a pressure sluice between the atmospheric pressure and the required conveying or system pressure. The pressurised conveying containers 26 or storage containers are filled with the solids originating from an external store via a suitable external conveying arrangement and, after closing the solids feed, are then pressurised for rendering inert and for building up the necessary system pressure. This is preferably carried out using process gas which is branched off from the stream of conveying gas. However, the required system pressure can also be built up using gas supplied from outside. After the pressure has built up and the solids have been rendered inert, the valve-controlled sluice and line system to the reactor 10 is opened and the solids are introduced into the reactor together with conveying gas or transport gas which can also contain the reaction gas. While one storage container operates for the supply of solids and gas into the reactor (pressurised conveying container 26), the other storage container is refilled with the next charge of solids. Before being refilled, the respective storage container is decompressed.

Overall, the pneumatic conveying arrangement by the technical adaptation, made in the embodiment according to FIG. 5, to elevated pressures of up to 200 bar and temperatures of up to 300° C. is an optimum device for feeding organic solids into sump phases for the purpose of direct liquefaction. In this respect, the solids particles are fed into the pressurised reactor rapidly and directly into its liquid sump phase, without being compacted. Furthermore, the solids are free from ballast auxiliaries, such as slurry liquid, so that the solids can be heated to reaction temperatures of approximately 300 to 600° C. in the sump phase very rapidly and with the smallest possible expenditure of energy. As a result, it is possible to achieve a particularly energy-efficient process management and a high yield of desirable liquid product. The solid carbonisation and tarring products which appear increasingly with a slow heating procedure are largely avoided.

Figure 6:
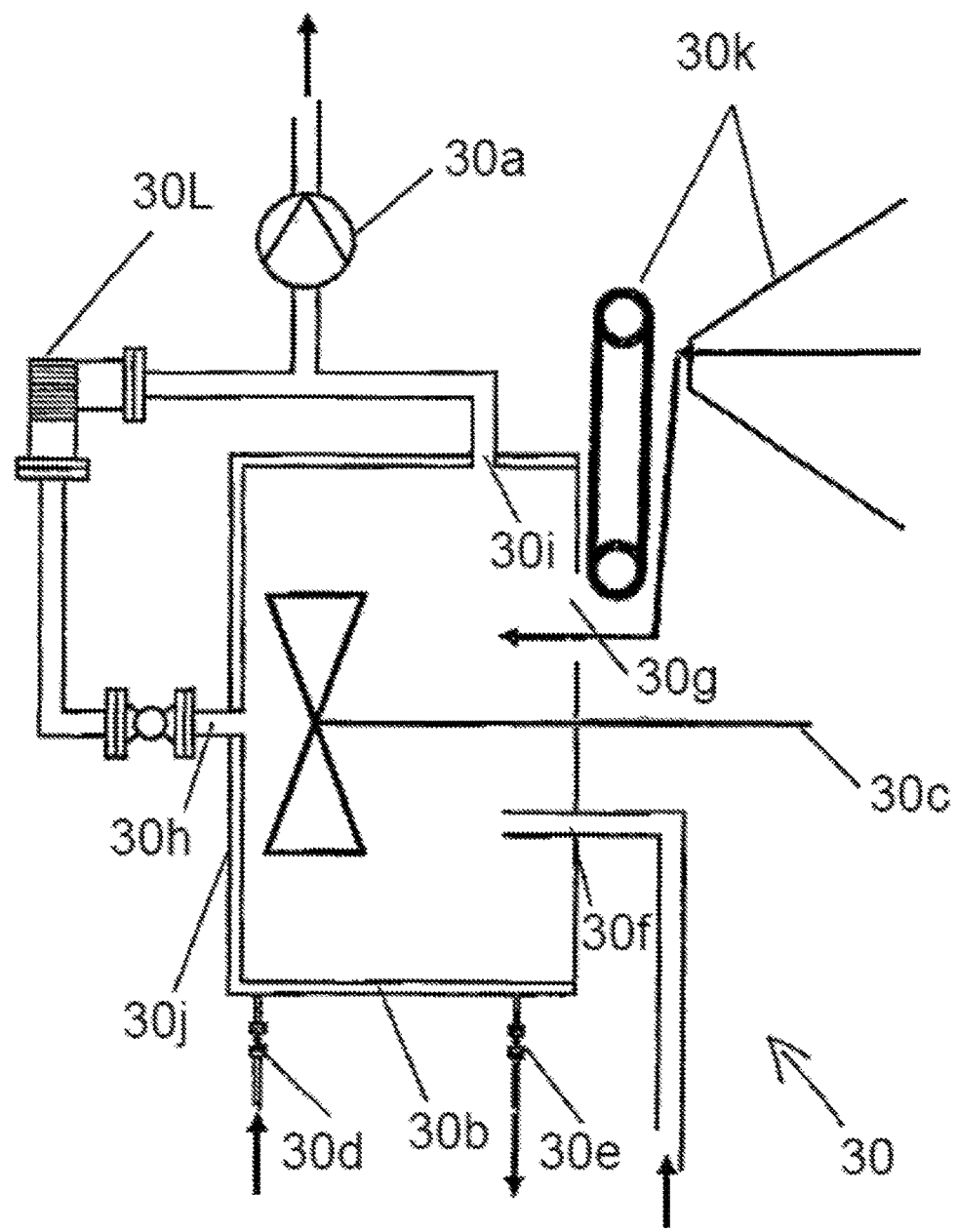
FIG. 6 is a schematic cross-sectional view through a slurrying device.

An example of a mechanical means 25 for the supply of solids is shown in FIG. 6 using the example of a slurry arrangement 30. The slurry arrangement 30 can be directly connected to the reactor 10 via a pump 30a. Alternatively, the slurry arrangement 30 can be provided in addition to the mechanical means 25 for solids supply, for example if the mechanical means 25 is configured as a worm arrangement 32 or as a piston arrangement 35.

The slurry arrangement 30 comprises a slurry container 30j with a heating jacket 30b and a stirrer/mixer 30c.

The heating jacket 30b has a first connecting piece 30d for the feed of heating medium and has a second connecting piece 30e for the discharge of heating medium. The slurry is preheated to the required temperature in the container via the controlled feed of heating medium.

The slurry container also has a third connecting piece 30f for the liquid supply, an opening 30g for the feed of biomass, a fourth connecting piece 30h for the discharge of the slurry and a fifth connecting piece 30l which can be used selectively for discharging the slurry or for externally recirculating the slurry.

Crushed biomass is continuously thrown via a suitable device 30k into the slurry container through the opening 30g. The biomass falls onto the surface of a slurry, a suspension or a liquid recipient which is already present. The liquid fed continuously via the third connecting piece 30f causes the surface to move, with the aid of the stirrer-mixer 30c, such that the biomass is suspended.

The slurry which is produced can then be removed via the fifth connecting piece 30i and pumped to the reactor 10 by means of the pump 30a.

The device is optionally fitted with a wet crushing unit 30l in order to further homogenise the resulting slurry and to crush coarse pieces which may be present in the biomass. For this purpose, the wet crushing unit 30l automatically suctions up through the fourth connecting piece 30h a partial flow of the slurry which is at least double the total from the input flows 10 and 12, and homogenises the slurry. One part of the slurry homogenised by the wet crushing unit 30l is suctioned up by the pump 30a and conveyed to the reactor, while another part flows back into the slurry container via the fifth connecting piece 30i and there generates additional turbulences for mixing in the biomass which is fed to the container through the opening 30g.

The slurry arrangement 30 according to FIG. 6 has the advantage that it is possible to directly feed crushed, moderately tempered solid material as slurry or in the form of paste into a sump phase heated to the reaction temperature. In so doing, no compacting of the crushed solids takes place. The slurry arrangement 30 allows the dissolution or digestion of the solids, preferably in the liquid circulating in the reactor, i.e. in oil, water, salt or metal melts or another organic liquid (for example a hydrogen carrier) and, if appropriate, an improved preheating possibility provided thereby. The use of the slurry arrangement 30 allows the slurry to be conveyed (as slurry or dissolved in the liquid) via pumps which are suitable for suspended solid charges.

Before being fed into the reactor (pressurised reactor or unpressurised reactor), the solids are suspended or dissolved by a suitable organic or inorganic liquid or optionally also water, preferably with liquid from the reactor circuit. The solid to liquid ratio is selected such that a flowable or pumpable medium is produced. This suspension or solution is preferably produced in an unpressurised container or in a container which is under low excess pressure. This container is usually fitted with a suitable stirrer and/or mixer. When the suspension or solution has been produced and, if appropriate, after heating, the medium is fed into the sump phase of the reactor (pressurised or unpressurised reactor) via a suitable pump device.

If crushed solids are conveyed in particular into pressure chambers, the slurrying of the solids particles with liquid can serve to make them flowable and pumpable in order to simplify the feed thereof into the pressure chamber. However, a slurrying procedure is problematic if the solids are to be liquefied by crack reactions at elevated temperatures of up to 500° C., since this is a particularly rapid heating of the solids and the slurry liquid as an additional ballast substance reduces the heating rate. In respect of crack reactions of direct liquefaction at relatively low temperatures of up to 500° C., it is known that a rapid heating usually increases the yield of undesirable liquid product, while with a slow heating procedure, carbonisation and tarring products are produced to an increasing extent. Surprisingly, these inter-relations do not apply in the case of the different starting materials (solid biogenic substances such as energy crops, wood, straw, bio-waste, inter alia; plastics waste and other solid organic substances), when product oil, produced in direct liquefaction, is used as the slurry liquid. As a result of this and also due to a preheating, associated with the hot product oil removed from the circuit, it is advantageously possible to carry out slurrying even with direct liquefaction.

In the case of the mentioned starting materials and slurry liquids, the feed of slurried solids satisfies the requirements of direct liquefaction and is a particularly economical solution, because simple pump systems can be used.

Figure 7:
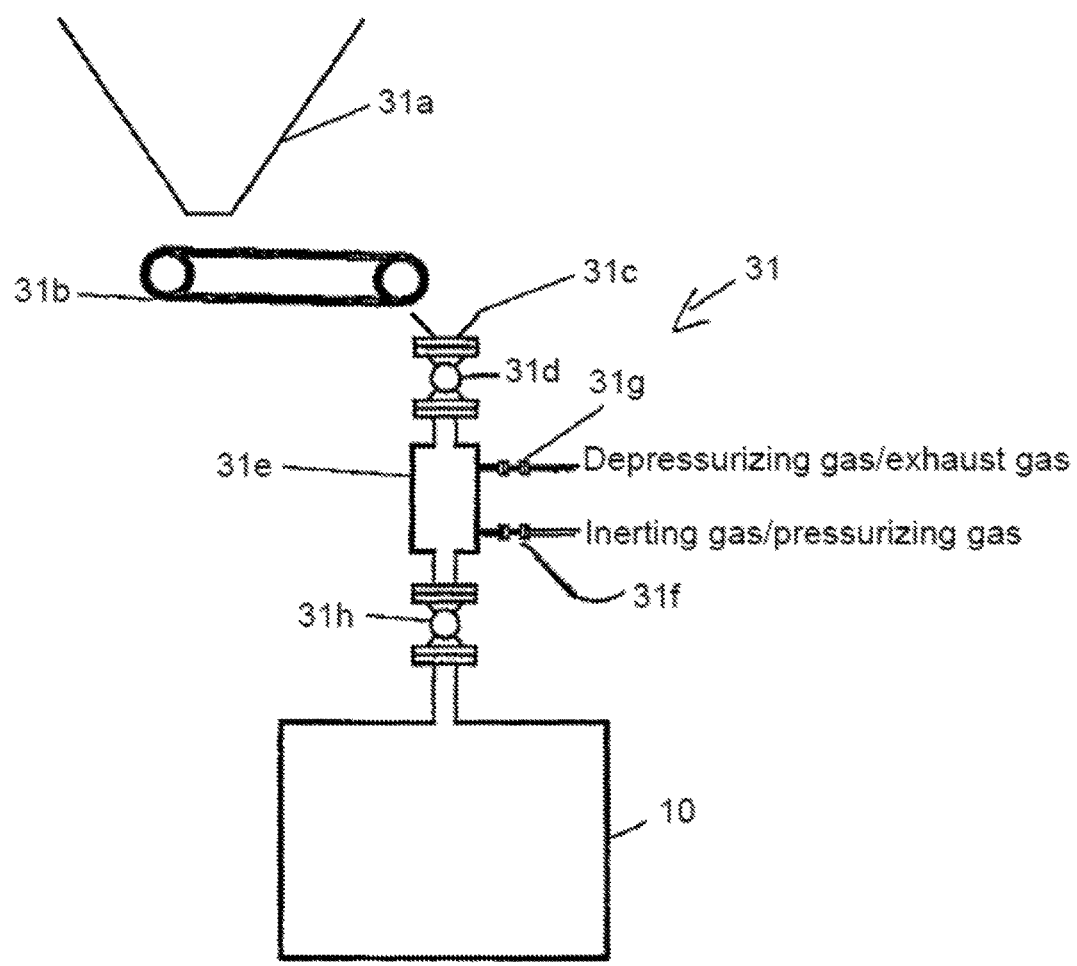
FIG. 7 is a schematic cross-sectional view through a sluice arrangement.

A further example of a mechanical means 25 for the supply of solids is shown in FIG. 7 which illustrates a sluice arrangement 31. The sluice arrangement 31 is constructed as follows and operates according to the following sequence:

From a receiving container 31a, biomass is conveyed into a sluice 31e by a suitable transport device 31b via a filling funnel 31c while the inlet ball valve 31d is open. When the sluice 31e is full, the transport device 31b stops and the inlet ball valve 31d closes. Inerting gas can flow into the sluice 31e through an open ball valve 31f and, while the exhaust gas ball valve 31g is open, it displaces oxygen or air which is contained in the sluice 31e after filling. When the air has been completely displaced, the exhaust gas ball valve 31g closes and the sluice 31e can be pressurised to system pressure, if appropriate, by a pressurising gas. When the pressure has been equalised between the sluice 31e and the following reactor 10, the glass ball valve 31f closes and an outlet ball valve 31h opens, as a result of which the solids contained in the sluice 31e are discharged into the reactor 10. Thereafter, firstly the outlet ball valve 31h closes and the exhaust gas ball valve 31g opens in order to release an excess pressure which may be present in the sluice 31e. When the pressure has been released through the exhaust gas ball valve 31g, the inlet ball valve 31d reopens and the filling procedure recommences.

The sluice arrangement 31 has the advantage that a direct feed of crushed and moderately tempered solids into a sump phase heated to the reaction temperature is possible, without ballast substances such as slurry liquid, being entrained which delay the heating procedure in the sump phase reactor.

During the introduction of the solids into the reactor 10, the sluice arrangement 31 allows the solids to be rendered inert (if this was impossible in an upstream storage arrangement), prevents gases, vapours and liquids from escaping out of the reactor and seals, if necessary, against an increased or high reactor pressure. In the case of a container sluice (gravity system), the solids inlet and outlet is provided with suitable valves, preferably with ball valves. In the case of a cellular wheel sluice (either as a gravity system or combined with a pneumatic conveying arrangement), it is possible to dispense with one or both valves, depending on the configuration and pressure tightness. As a rule, a sluice system operates on a gravity basis such that, to fill the sluice, the outlet valve is closed (if appropriate in a pressure-tight manner) and the inlet valve is opened. When the sluice chamber has been filled, the inlet valve is closed (if appropriate in a pressure-tight manner), while the outlet valve initially also remains closed. It is then possible to render the sluice chamber inert, using gas or liquid and, if appropriate, to build up pressure in keeping with the counter-pressure in the reactor. Thereafter, the outlet valve is opened and the contents can be introduced into the reactor or, if appropriate, into a prestage to the reactor, by gravity or optionally also by a flushing procedure. At least two separate sluice chambers are preferably used which are operated alternately to ensure a continuous feed of solid material. If a cellular wheel sluice is used, a virtually continuous feed is also possible with one sluice.

Surprisingly, the sluice system with different starting materials (solid biogenic substances such as energy crops, wood, straw, bio-waste, inter alia; plastics waste and other solid organic substances) is a possibility of introducing dry crushed solids particles rapidly enough into a liquid sump phase against elevated pressures of up to 200 bar or also without pressure at temperatures of up to 300° C. Thus, the sluice conveying method is surprisingly suitable for the introduction of the mentioned dry organic solids into sump phases for the purpose of direct liquefaction. The solids particles are to be fed into the reactor (pressurised reactor or unpressured reactor) rapidly and directly into its liquid sump phase, and are to be as free as possible from ballast auxiliaries, such as slurry liquid so that they can be heated to reaction temperatures of approximately up to 500° C. in the sump phase very rapidly and with the smallest possible expenditure of energy. This is important for an energy-efficient process management and for a high yield of desirable liquid product. Solid carbonisation and tarring products appear to an increasing extent with a slow heating procedure.

The sluice conveying method satisfies the requirements in the case of the mentioned starting materials and for these cases, is a particularly favourable solution with regard to the plant production costs, compared to other feed systems into pressure chambers.

Figure 8:
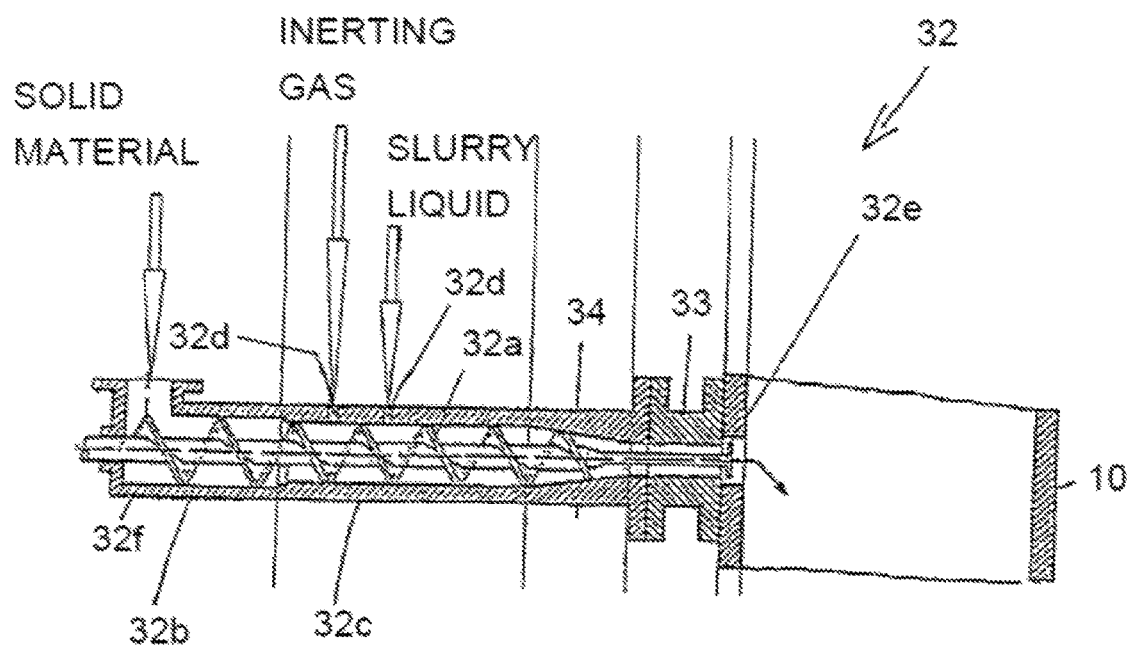
FIG. 8 is a cross-sectional view through a worm arrangement.

A further embodiment of a mechanical means 25 for solids supply is explained using the worm arrangement 32 according to FIG. 8.

In the worm arrangement 32, the dry solid material is supplied by a suitable unit (not shown) and is further broken up in the crushing zone 32b by a suitable construction of the worm spirals 32a.

In the following mixing and slurrying zone 32c, if appropriate additives, inerting gas and/or liquids for slurrying and preheating the solids can be added through openings 32d. Furthermore, the worm arrangement 32 can be heated, for example by electric band heaters which are mounted around the tubular body 32f (housing).

In the compression zone 34, the pitch of the worm spirals 32a changes and the tubular body 32f converges conically such that the solids are compressed here and thus a plug is built up against the internal pressure of the high pressure container or reactor 10.

The plug zone 33 acts as a pressure barrier against liquids and gases in the reactor. In this zone 33, the solids are not further compressed, but only continue to be pushed forwards.

Upstream of the inlet for the compacted solids into the high pressure container or reactor 10, there is a crushing or deagglomerating device 32e. In the present example, blades which crush the strand are fitted to the elongated worm shaft 32a.

The worm arrangement 32 introduces crushed, moderately tempered solids directly and continuously into the sump phase heated to the reaction temperature. Furthermore, the worm arrangement 32 makes it possible to heat the solids with or without slurry oil, if this is useful or necessary. In this respect, it is possible to feed solids without ballast auxiliaries, such as slurry liquid, to avoid a delayed heating procedure in the sump phase reactor. In addition, a solids feed with slurry liquid is possible, in which case the slurry liquid and the solids can be premixed by mixing elements installed in the conveying worm.

The worm arrangement 32 draws the solids (with or without slurry liquid) from an upstream storage container (usually a buffer store) into the conveying worm. To prevent consolidation, a suitable feed device (for example a feed worm) can be used. In parallel with the primary task of conveying solids into the reactor, the worm can assume further tasks. By compression it can build up a stopper against a reactor pressure which may be present (sealing from the atmosphere or lower pressure stages); it can produce a mixture of solids and slurry liquid by suitable installed mixing elements; it can preheat the solids or mixtures thereof by suitable heating arrangements and can degas the supplied solids and mixtures thereof (i.e. remove air and oxygen). The outlet of the worm machine can be provided with a crushing arrangement (for example a rotating blade arrangement) which breaks down the compacted material again upstream of the reactor inlet.

With different starting materials (solid biogenic substances such as energy crops, wood, straw, bio-waste, inter alia; plastics waste and other solid organic substances), the worm arrangement 32 is a possibility of introducing crushed solids particles into pressure chambers against elevated pressures of up to 200 bar at temperatures of up to 300° C. without sealing problems. The solids form a plug which is even impermeable to pressurised hydrogen. Thus, the worm conveying method is surprisingly suitable for the introduction of the mentioned organic solids into sump phases for the purpose of direct liquefaction under hydrogen pressure or also without pressure. The solids particles should preferably be free from ballast auxiliaries, such as slurry liquid so that they can be heated to reaction temperatures of approximately up to 500° C. in the sump phase very rapidly and with the smallest possible expenditure of energy. This is important for an energy-efficient process management and for a high yield of desirable liquid product. Solid carbonisation and tarring products appear to an increasing extent when there is a slow heating procedure in the reactor.

In the case of the mentioned starting materials, the worm conveying method satisfies the necessary requirements, in particular during a feed into pressure chambers, without a complex systems technology being required. Moreover, sealing problems do not occur when the solids are conveyed against high pressures and there is no need to add slurry liquid.

Figure 9A:
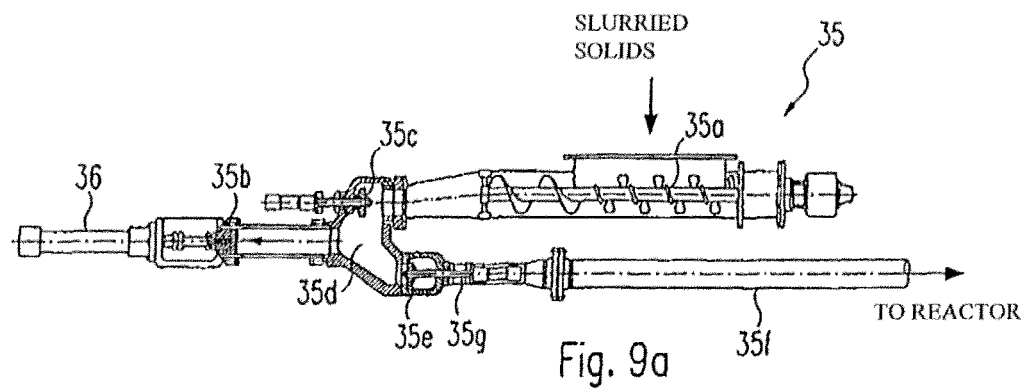
FIG. 9a, 9b are cross-sectional views through a piston arrangement in two different piston positions.
Figure 9B:
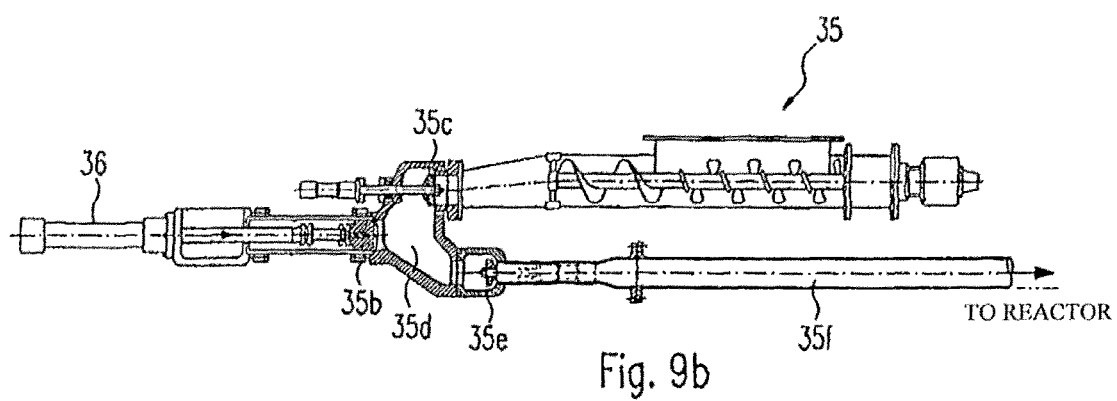
Figure 10:
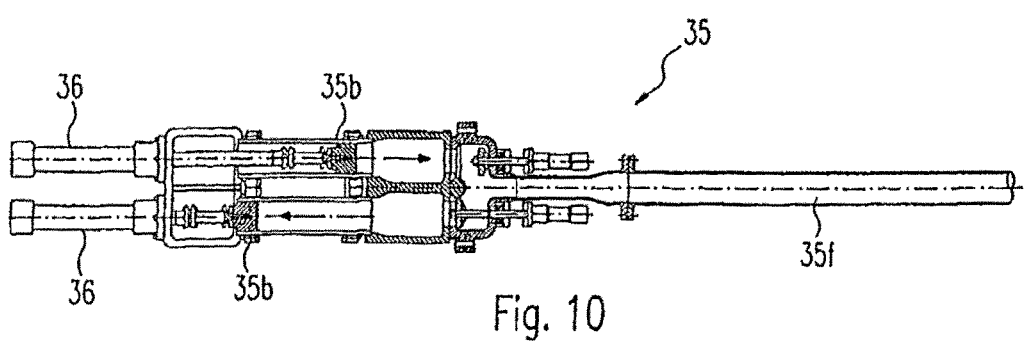
FIG. 10 is a cross-sectional view through a piston arrangement with two pressure cylinders.

The mechanical means 25 for solids supply can also be realised in the form of a piston arrangement 35, as shown in FIGS. 9a, 9b and 10.

FIG. 9a shows the intake stroke of the piston arrangement 35. The conveying medium is supplied to the piston arrangement 35 via a worm 35a during the backwards movement of the working piston 35b and passes via an open, hydraulically actuated suction valve 35c into the product chamber 35d of the pump or piston arrangement 35.

FIG. 9b shows the working or pressure stroke of the piston ar angement. The suction valve 35c closes and the pressure cylinder 36 presses the working piston 35b into the product chamber 35d, as a result of which the pressure valve 35e opens and pushes the slurry into the pipeline 35f to the reactor 10.

The pressure-side valve rods 35g are not located in the conveying flow region. Due to this valve arrangement, the entire flow cross section is available during the pressure stroke.

FIG. 10 shows by way of example a piston arrangement 35 with two pressure cylinders 36 for continuous conveying.

The double piston device for feeding biomass comprises two parallel pressure cylinders 36 and working pistons 35b which use a common pressurised conveying line 35f to the reactor 10.

The piston arrangement 35 allows the direct, discontinuous or continuous feed of crushed, moderately tempered solids which are slurried with liquid, into a sump phase heated to the reaction temperature. In addition thereto, it is also possible to convey or feed non-slurried solids, which promotes a rapid heating in the reactor. The piston arrangement 35 affords a good inerting possibility in the pump pressure chamber between piston and discharge barrier. There is also a good possibility of preheating the solids or slurrying them before they are fed into the reactor 10.

The filling region of the piston arrangement 35 is filled with solids (with or without slurry liquid) from an upstream storage container (usually a buffer store). A suitable feed arrangement (for example a feed worm) can be used to prevent bridge formations. During the filling procedure, the discharge pipe of the piston arrangement is closed to the reactor by a suitable sluice (for example a slider or valve).

After the filling region has been filled, the piston pushes the material into a pipe which is closed on all sides. In parallel with the primary task of conveying the solids into the reactor, the tubular chamber closed by the piston and the sluice is used to seal against a reactor pressure which may be present and to build up the necessary system pressure (sealing against the atmosphere or lower pressure stages). If required, the solids or the slurry thereof can be preheated by suitable heating arrangements and, if appropriate, the supplied solids and the slurry thereof can be rendered inert by gases supplied from outside (removal of air and oxygen). When the mentioned tasks have been completed in the closed tubular chamber, the sluice to the reactor opens and the piston pushes the material into the sump region of the reactor. The reactor is fed discontinuously when a device with one piston is used. A continuous reactor feed is possible by a multi-piston system. The piston device is usually driven hydraulically, although it can also be driven electrically.

With different starting materials (solid biogenic substances such as energy crops, wood, straw, bio-waste, inter alia; plastics waste and other solid organic substances), the piston arrangement 35 is a possibility of introducing crushed solids particles with and without liquid fractions into pressure chambers against elevated pressures of up to 200 bar at temperatures of up to 300° C. Thus, the piston conveying method is suitable for the introduction of the mentioned dry organic solids into sump phases for the purpose of pressurised or unpressurised direct liquefaction. The solids particles are introduced into the (pressurised or unpressurised) reactor rapidly and directly into the sump phase thereof and are preferably free from ballast auxiliaries, such as slurry liquid so that they can be heated to reaction temperatures of approximately up to 600° C. in the sump phase very rapidly and with the smallest possible expenditure of energy. This is important for an energy-efficient process management and for a high yield of desirable liquid product. Solid carbonisation and tarring products appear to an increasing extent when there is a slow heating procedure.

Overall, the mechanical means 25, described above, for the feed of solid materials, in particular the slurry arrangement 30, the sluice arrangement 31, the worm arrangement 32 and the piston arrangement 35 can be used effectively for feeding starting materials or residual materials into a pressurised reactor which is used in conjunction with the direct liquefaction of high-molecular weight organic substances into low-viscosity combustibles and fuels.

The invention claimed is:

1. A device for producing starting materials, combustibles and fuels from organic substances comprising a reactor (10) which has a feed arrangement (11) for the organic substances, a discharge arrangement (12) for reaction products and an arrangement (13) for the supply of reaction energy for the conversion of the organic substances into the reaction products,
   wherein the reactor (10) comprises an arrangement (14) for forming a circulating flow inside the reactor;
   wherein the arrangement for forming the circulating flow inside the reactor comprises at least one propulsion jet nozzle (15) which opens into a housing (16) of the reactor (10);
   wherein the reactor (10) comprises an arrangement (20) for forming a circulation outside the reactor comprising at least one circulation line (21) connecting two spaced apart portions (22, 23) of the reactor;
   wherein the at least one circulation line (21) comprises a discharge (43) adjacent to one of the two spaced apart portions (22);
   wherein the at least one propulsion jet nozzle (15) extends in an axial direction below the discharge (43);
   wherein the at least one propulsion jet nozzle (15) has at least two nozzle pipes (17, 18);
   wherein at least one guide pipe (19) is arranged in the housing (16) such that it aligns with the at least one propulsion jet nozzle (15);
   wherein a degassing arrangement (37) is arranged between the reactor (10) and the discharge arrangement (12); and
   wherein the feed arrangement (11) has a pneumatic and/or mechanical means (24, 25) for the supply of solid material.

2. A device according to claim 1, wherein the at least one circulation line (21) is connected to the at least one propulsion jet nozzle (15).

3. A device according to claim 1, wherein the arrangement (20) for forming a circulation outside the reactor has a heating arrangement.

4. A device according to claim 1, wherein the arrangement (20) for forming a circulation outside the reactor comprises a filter arrangement.

5. A device according to claim 1, wherein a droplet collector (47) is arranged upstream of the discharge arrangement (12).

6. A device according to claim 1, wherein the pneumatic and/or mechanical means (24, 25) for solids supply has a high temperature-resistant anti-adhesion coating (38).

7. A device according to claim 1, wherein the pneumatic means and/or mechanical means (24, 25) for solids supply is associated with the arrangement (14) for forming the circulation inside the reactor.

8. A device according to claim 1, wherein the pneumatic means and/or mechanical means (24, 25) for solids supply is connected to the at least one propulsion jet nozzle (15).

9. A device according to claim 1, wherein the pneumatic means and/or mechanical means (24, 25) for solids supply has at least one pressurised conveying container (26) which can be connected to the reactor (10).

10. A device according to claim 9, wherein at least two pressurised conveying containers (26) are provided which can be operated in alternation.

11. A device according to claim 9, wherein the pneumatic means and/or mechanical means (24, 25) for solids supply has a transport gas arrangement (27a) and/or a fluidising gas arrangement (27b) which can be connected to the pressurised conveying container (26) or containers (26).

12. A device according to claim 11, wherein a gas-permeable lining (39) of the at least one pressurised conveying container (26) is arranged at least in the region of a feed opening (28) of the pressurised conveying container (26) for the fluidising gas arrangement (27b).

13. A device according to claim 11, wherein a supply means (40) of the transport gas arrangement (27a) is arranged in the region of a discharge opening (41) of the at least one pressurised conveying container (26).

14. A device according to claim 13, wherein the supply means (40) comprises a lance which projects into the at least one pressurised conveying container (26) up into the region of the discharge opening (41).

15. A device according to claim 1, wherein the pneumatic means and/or mechanical means (24, 25) for solids supply is associated with the arrangement (20) for forming the circulation outside the reactor.

16. A device according to claim 1, wherein the pneumatic means and/or mechanical means (24, 25) for solids supply is arranged in the conveying direction upstream or downstream of a pump (29) of the arrangement (20) for forming the circulating flow outside the reactor.

17. A device according to claim 1, wherein a slurry arrangement (30) is arranged upstream of the pneumatic means and/or mechanical means (24, 25) for solids supply.

18. A device according to claim 1, wherein the mechanical means (25) for solids supply comprises a sluice arrangement (31).

19. A device according to claim 1, wherein the pneumatic means and/or mechanical means (24, 25) for solids supply comprises a worm arrangement (32) with a pressure blocking portion (33) which is arranged downstream of a compression portion (34) for forming a blocking plug.

20. A device according to claim 1, wherein the pneumatic means and/or mechanical means (24, 25) for solids supply comprises a piston arrangement (35).

21. A device according to claim 20, wherein the piston arrangement (35) comprises at least one pressure cylinder (36).

22. A device according to claim 1, wherein only static built-in components are arranged in the reactor (10).

23. A device according to claim 1, wherein the at least one circulation line (21) is connected to one of the two nozzle pipes (17, 18).

24. A device according to claim 1, wherein the degassing arrangement (37) comprises a degassing head (37a) and a droplet collector (47).

25. A device for producing starting materials, combustibles and fuels from organic substances comprising a reactor (10) which has a feed arrangement (11) for the organic substances, a discharge arrangement (12) for reaction products and an arrangement (13) for the supply of reaction energy for the conversion of the organic substances into the reaction products, wherein the reactor (10) comprises an arrangement (14) for forming a circulating flow inside the reactor;

wherein the arrangement for forming the circulating flow inside the reactor comprises at least one propulsion jet nozzle (15) which opens into a housing (16) of the reactor (10);

wherein the reactor (10) comprises an arrangement (20) for forming a circulation outside the reactor comprising at least one circulation line (21) connecting two spaced apart portions (22, 23) of the reactor;

wherein the at least one circulation line (21) comprises a discharge (43) adjacent to one of the two spaced apart portions (22);

wherein the at least one propulsion jet nozzle (15) extends in an axial direction below the discharge (43);

wherein the at least one propulsion jet nozzle (15) has at least two nozzle pipes (17, 18);

wherein at least one guide pipe (19) is arranged in the housing (16) such that it aligns with the at least one propulsion jet nozzle (15);

wherein a degassing arrangement (37) is arranged between the reactor (10) and the discharge arrangement (12); and wherein the degassing arrangement (37) comprises a degassing head (37a), a droplet collector (47), and a drip ring (48).

26. A device according to claim 25, wherein the drip ring (48) is mounted on an outer edge of the reactor (10).

27. A device according to claim 25, wherein the drip ring (48) is formed integrally with an outer edge of the reactor (10).

* * * * *